United States Patent
Lu et al.

(10) Patent No.: US 11,580,676 B1
(45) Date of Patent: Feb. 14, 2023

(54) METHOD FOR EMBEDDING USER INFORMATION IN WEBPAGES AND ELECTRONIC DEVICE IMPLEMENTING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Hui-Feng Liu, Shenzhen (CN); Yu-Yong Zhang, Shenzhen (CN); Shou-Feng Fan, Shenzhen (CN); Fu-Fa Cai, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/552,906

(22) Filed: Dec. 16, 2021

(30) Foreign Application Priority Data

Jul. 16, 2021 (CN) .......................... 202110806627.6

(51) Int. Cl.
*G06F 21/60* (2013.01)
*G06T 11/00* (2006.01)
*G06F 40/14* (2020.01)

(52) U.S. Cl.
CPC .......... *G06T 11/001* (2013.01); *G06F 21/602* (2013.01); *G06F 40/14* (2020.01)

(58) Field of Classification Search
CPC ....... G06T 11/001; G06F 40/14; G06F 21/602
See application file for complete search history.

(56) References Cited

U.S. PATENT DOCUMENTS

| | | | |
|---|---|---|---|
| 8,009,862 B2 * | 8/2011 | Zandifar | G06T 1/0021 382/168 |
| 8,891,862 B1 * | 11/2014 | Wolk | G06V 10/462 382/199 |
| 2002/0129252 A1 * | 9/2002 | Nishitani | G06T 1/0028 713/176 |
| 2003/0097568 A1 * | 5/2003 | Choi | G06T 1/0042 713/176 |
| 2008/0080009 A1 * | 4/2008 | Masui | G06T 1/0028 358/3.28 |
| 2011/0314550 A1 * | 12/2011 | Mastrangelo | G06T 1/0021 726/26 |
| 2017/0329943 A1 * | 11/2017 | Choi | G06F 21/10 |
| 2018/0292951 A1 * | 10/2018 | Kato | G09G 5/377 |
| 2022/0269487 A1 * | 8/2022 | Zevulun | G06F 21/602 |

* cited by examiner

*Primary Examiner* — Scott T Baderman
*Assistant Examiner* — Mario M Velez-Lopez
(74) *Attorney, Agent, or Firm* — ScienBiziP, P.C.

(57) ABSTRACT

In a method for embedding user information in webpages, user information of a user who logs into a target website is obtained. The user information is converted into color values. The color values are embedded in a target webpage of the target website. If a webpage is leaked, a user who leaks the webpage can be traced.

17 Claims, 2 Drawing Sheets

METHOD FOR EMBEDDING USER INFORMATION IN WEBPAGES AND ELECTRONIC DEVICE IMPLEMENTING METHOD

FIELD

The subject matter herein generally relates to data security, specifically a method for embedding user information in webpages based on color coding and an electronic device implementing the method.

BACKGROUND

With the development of enterprise informatization, information security of enterprise website has become more and more important. If a webpage is leaked, it is difficult to trace the source of the leakage, and a means of tracing the leaker would be additional security against the leaking.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Figure 1:
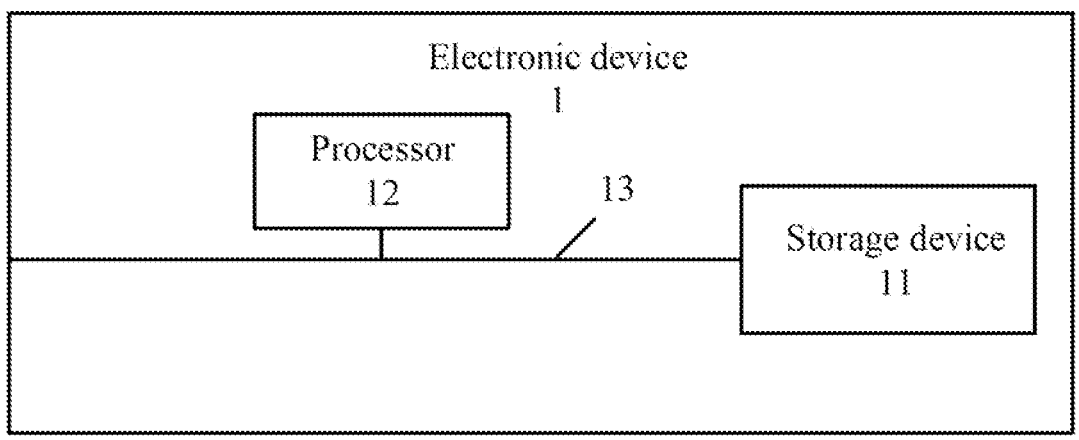
FIG. 1 is a block diagram of an electronic device implementing a method for embedding user information in webpages in one embodiment of the present disclosure.

FIG. 1 is a block diagram of an electronic device implementing a method for embedding user information in webpages in one embodiment of the present disclosure. Referring to FIG. 1, an electronic device 1 includes, but is not limited to, a storage device 11 and at least one processor 12. The above-mentioned components may be connected through a communication bus 13 or directly connected.

The electronic device 1 may be a computer, a mobile phone, a tablet computer, a personal digital assistant (PDA), and other devices with application programs installed. Those skilled in the art can understand that FIG. 1 is only an example of the electronic device 1 and does not constitute a limitation on the electronic device 1. For example, the electronic device 1 may also include input and output devices, network access devices, buses, and so on.

Security of information in relation to an enterprise website is more and more necessary. The electronic device 1 can embed user information in a webpage. When the webpage is leaked, a user who leaks the webpage can be traced.

Figure 2:
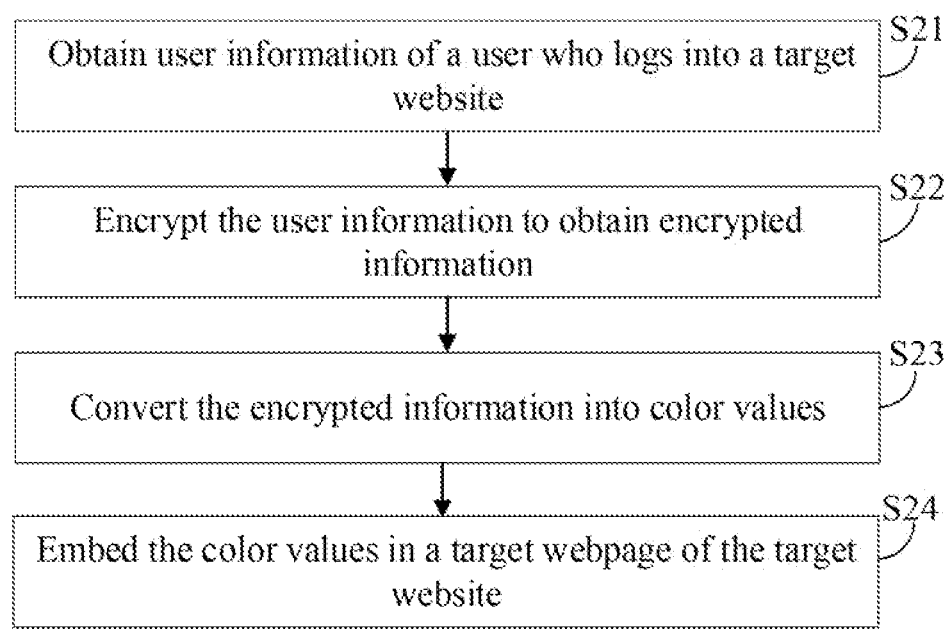
FIG. 2 is a flowchart of a method for embedding user information in webpages provided in one embodiment of the present disclosure.

FIG. 2 is a flowchart of a method for embedding user information in webpages in one embodiment. The method may be applied in an electronic device (such as the electronic device 1 of FIG. 1). According to different requirements, the order of the steps in the flowchart may be changed, and some steps may be omitted.

In block S21, the electronic device obtains user information of a user who logs into a target website.

The target website can be an enterprise website.

The user information may include a user name and/or a user ID. The user information may include Chinese character, alphabetic character, and numeric string. For example, the user information is "中 A1234567".

In one embodiment, when the user logs into the target website, the electronic device obtains the user information input by the user.

In block S22, for additional security, the electronic device can encrypt the user information to obtain encrypted information.

A method of encrypting the user information to obtain the encrypted information may include: randomly generating a character string; and encrypting the user information using the character string.

In the process of encrypting the user information, the character string may be used as an encryption key, and a preset encryption algorithm may be used to encrypt the user information. The preset encryption algorithm can be selected according to user requirements. For example, the preset encryption algorithm may be Advanced Encryption Standard (AES) encryption algorithm or exclusive or (XOR) encryption algorithm.

In another embodiment, the user information may be left unencrypted.

In block S23, the electronic device converts the encrypted information into color values.

In another embodiment, the electronic device may convert the user information into color values.

In one embodiment, a method of converting the user information or the encrypted information into color values may include (1) to (5) described below.

(1) The electronic device determines a Chinese character, an alphabetic character, and a numeric string in the user information or the encrypted information.

(2) The electronic device converts the Chinese character (such as " 中 ") into a first RGB value according to a first conversion rule. The first RGB value includes a first red (R) value, a first green (G) value, and a first blue (B) value. A method of converting the Chinese character into a first RGB value according to a first conversion rule may include: converting the Chinese character into a decimal ASCII code; dividing the decimal ASCII code into three portions denoted as A1, B1, and C1 according to a first ratio; calculating the first R value, the first G value, and the first B value according to the three portions of A1, B1, and C1; and combining the first R value, the first G value, and the first B value to the first RGB value. The first R value can be 255/A1, the first G value can be 255/B1, and the first B value can be 255/C1. A RGB value is a color value of red (R), green (G), and blue (B) channels. It should be noted that when A1 is equal to 0, the first R value is 0, when B1 is equal to 0, the first G value is 0, and when C1 is equal to 0, the first B value is 0.

(3) The electronic device converts the alphabetic character (such as "A") into a transparency value according to a second conversion rule. A method of converting the alphabetic character into a transparency value according to a second conversion rule may include: obtaining an ordinal number of the alphabetic character in an alphabet; calculating a ratio value according to the ordinal number and a preset scale factor; and setting the ratio value as the transparency value. It should be noted that the preset scale factor is equal to or more than 26. The smaller the transparency value, the more transparent a color, and the larger the transparency value, the more opaque the color.

(4) The electronic device converts the numeric string (such as "1234567") into a second RGB value according to a third conversion rule. The second RGB value includes a second R value, a second G value, and a second B value. A method of converting the numeric string into a second RGB value according to a third conversion rule may include: dividing the numeric string into three portions denoted as A2, B2, and C2 according to a second ratio; calculating the second R value, the second G value, and the second B value according to the three portions of A2, B2, and C2; and combining the second R value, the second G value, and the second B value to the second RGB value. The second R value can be 255/A2, the second G value can be 255/B2, and the second B value can be 255/C2. It should be noted that when A2 is equal to 0, the second R value is 0, when B2 is equal to 0, the second G value is 0, and when C2 is equal to 0, the second B value is 0.

(5) The electronic device obtains the color values according to the first RGB value, the transparency value, and the second RGB value.

For example, the user information is " 中 A1234567". A first character in the user information is a Chinese character " 中 ", and a decimal ASCII code obtained for " 中 " is "54992". "54992" can be divided into three portions of 54, 99, and 2 according to the first ratio. The first R value is calculated to be 255/54=4.722. The first G value is calculated to be 255/99=2.576. The first B value is calculated to be 255/2=127.5. The first RGB value is (4.722, 2.576, 127.5). The first RGB value (4.722, 2.576, 127.5) denotes a color. A second character in the user information is an alphabetic character "A", an ordinal number of "A" in the alphabet is 1, the preset scale factor is 26, and the transparency value is 1/26=0.038. The remaining characters in the user information are numeric string "1234567", and "1234567" is divided into three groups of 123, 45, and 67 according to the second ratio. The second R value is calculated to be 255/123=2.073. The second G value is calculated to be 255/45=5.667. The second B value is calculated to be 255/67=3.806. The second RGB value is (2.073, 5.667, 3.806). The second RGB value (2.073, 5.667, 3.806) also denotes a color.

The method of converting the user information into color values according to conversion rules between color values and characters ensures that the R value, the G value, and the B value are all within the range of (0, 255).

In block S24, the electronic device embeds the color values in a target webpage of the target website.

The target webpage can be any webpage of the target website.

The user information can be retrieved and obtained according to the color values embedded in the target webpage.

In one embodiment, a method of embedding the color values in the target webpage may include: generating a graphic according to the color values; and embedding the graphic in the target webpage. The graphic can be generated according to user requirements. For example, the graphic can be a bar code. A location where the graphic is embedded can be set according to user requirements. For example, the graphic can be embedded at a lower right corner of the target webpage.

After embedding the graphic in the target webpage, the electronic device may further obtain the first RGB value, the transparency value, and the second RGB value according to the graphic. The electronic device obtains the Chinese character according to the first RGB value; obtains the alphabetic character according to the transparency value, and obtains the numeric string according to the second RGB value. The electronic device obtains the user information according to the Chinese character, the alphabetic character, and the numeric string. According to the user information, the user can be identified.

The graphic may include the color values. The electronic device may identify the color values according to the graphic, and obtain the first RGB value, the transparency value, and the second RGB value from the color values. The electronic device may calculate the decimal ASCII code (the decimal ASCII code may be 255/the first RGB value), and obtain the Chinese character according to the decimal ASCII code. The electronic device may calculate the ordinal number (the ordinal number may be 26*the transparency value), and obtain the alphabetic character according to the ordinal number. The electronic device may calculate the numeric string (the numeric string may be 255/the second RGB value). The electronic device can retrieve the user information according to the Chinese character, the alphabetic character, and the numeric string. A user information database may be searched to determine whether the data input by a user matches the retrieved user information.

In one example, the first RGB value, the transparency value, and the second RGB value are respectively (4.722, 2.576, 127.5), 0.038, and (2.073, 5.667, 3.806). (255/4.722, 255/2.576, 255/127.5) (i.e., (54, 99, 2)) is output as a calculation. Therefore, the decimal ASCII code is 54992, and the Chinese character " 中 " is obtained according to the decimal ASCII code of "54992". The ordinal number is calculated as 26*0.038 (i.e., 1), and the alphabetic character "A" is obtained according to the ordinal number. (255/2.073, 255/5.667, 255/3.806) (i.e., (123, 45, 67)) is output, therefore, the numeric string is 1234567. According to the Chinese character, the alphabetic character, and the numeric string, the user information " 中 A1234567" is obtained.

In the present disclosure, user information is converted into color values, the color values are embedded in the target webpage. If the target webpage or information in the target webpage is leaked, the user information can be obtained from the target webpage. Therefore, the source of the leakage can be traced, the security of the target webpage is improved.

Referring to FIG. 1, in one embodiment, the storage device 11 may be an internal memory of the electronic device 1, that is, a memory built in the electronic device 1. In other embodiments, the storage device 11 may also be a connected external memory of the electronic device 1.

The storage device 11 may be used to store computer program, and the processor 12 implements various functions of the electronic device 1 by running or executing the computer program or module stored in the storage device 11 and calling up data stored in the storage device 11. The storage device 11 may mainly include a storage program area and a storage data area. The storage program area may store an operating system, an application program required by at least one function, etc.; the storage data area may store data created according to the use of the electronic device 1. In addition, the storage device 11 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 12 may be a central processing unit (CPU) or other general-purpose processor, a digital signal processor (DSP), an application specific integrated circuit (ASIC), a field-programmable gate array (FPGA) or other programmable logic device, a discrete gate, or a transistor logic device, or a discrete hardware component, etc. The processor 12 may be a microprocessor or any conventional processor. The processor 12 may be a control center of the electronic device 1, and connect various parts of the entire electronic device 1 by using various interfaces and lines.

In an exemplary embodiment, the computer program may be divided into one or more modules, and the one or more modules are stored in the storage device 11 and executed by the processor 12 to complete the method for embedding user information in webpages of the present disclosure. The one or more modules can be a series of computer-readable instruction segments capable of performing specific functions, and the instruction segments are used to describe execution processes of the computer program in the electronic device 1.

When the modules integrated in the electronic device 1 are implemented in the form of software functional units and used as independent units, they can be stored in a non-transitory readable storage medium. Based on this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the steps of the foregoing method embodiments. The computer-readable instructions include computer-readable instruction codes, and the computer-readable instruction codes can be source code, object code, an executable file, or in some intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

It should be understood that the disclosed electronic device and method may be implemented in other ways. For example, the embodiment of the electronic device described above is merely illustrative. For example, the units are only obtained by logical function divisions, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the method of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable an electronic device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but do not signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A method for embedding user information in webpages, comprising:
    obtaining user information of a user who logs into a target website;
    converting the user information into color values, comprising: determining a Chinese character, an alphabetic character, and a numeric string in the user information; converting the Chinese character into a first RGB value according to a first conversion rule; converting the alphabetic character into a transparency value according to a second conversion rule; converting the numeric string into a second RGB value according to a third conversion rule; and obtaining the color values according to the first RGB value, the transparency value, and the second RGB value; and
    embedding the color values in a target webpage of the target website.

2. The method for embedding user information in webpages of claim 1, before converting the user information into color values, the method further comprising:
    encrypting the user information to obtain encrypted information.

3. The method for embedding user information in webpages of claim 1, converting the Chinese character into a first RGB value according to a first conversion rule comprising:
    converting the Chinese character into a decimal ASCII code;
    dividing the decimal ASCII code into three portions denoted as A1, B1, and C1 according to a first ratio;
    calculating a first R value, a first G value, and a first B value according to the three portions of A1, B1, and C1, the first R value being 255/A1, the first G value being 255/B1, and the first B value being 255/C1; and
    combining the first R value, the first G value, and the first B value to the first RGB value.

4. The method for embedding user information in webpages of claim 1, converting the alphabetic character into a transparency value according to a second conversion rule comprising:
    obtaining an ordinal number of the alphabetic character in an alphabet; and calculating a ratio value according to the ordinal number and a preset scale factor; and setting the ratio value as the transparency value.

5. The method for embedding user information in webpages of claim 1, converting the numeric string into a second RGB value according to a third conversion rule comprising:

dividing the numeric string into three portions denoted as A2, B2, and C2 according to a second ratio;

calculating a second R value, a second G value, and a second B value according to the three portions of A2, B2, and C2, the second R value being 255/A2, the second G value being 255/B2, and the second B value being 255/C2; and combining the second R value, the second G value, and the second B value to the second RGB value.

6. The method for embedding user information in webpages of claim 1, embedding the color values in a target webpage comprising:

generating a graphic according to the color values; and embedding the graphic in the target webpage.

7. The method for embedding user information in webpages of claim 6, further comprising:

obtaining a first RGB value, a transparency value, and a second RGB value according to the graphic;

obtaining a Chinese character according to the first RGB value;

obtaining an alphabetic character according to the transparency value;

obtaining a numeric string according to the second RGB value; and obtaining the user information according to the Chinese character, the alphabetic character, and the numeric string.

8. An electronic device comprising:

at least one processor; and a storage device storing computer-readable instructions, which when executed by the at least one processor, cause the at least one processor to:

obtain user information of a user who logs into a target website;

convert the user information into color values, comprising: determining a Chinese character, an alphabetic character, and a numeric string in the user information; converting the Chinese character into a first RGB value according to a first conversion rule; converting the alphabetic character into a transparency value according to a second conversion rule; converting the numeric string into a second RGB value according to a third conversion rule; and obtaining the color values according to the first RGB value, the transparency value, and the second RGB value; and embed the color values in a target webpage of the target website.

9. The electronic device of claim 8, wherein the at least one processor is further caused to:

encrypt the user information to obtain encrypted information.

10. The electronic device of claim 8 wherein the at least one processor is further caused to:

convert the Chinese character into a decimal ASCII code;

divide the decimal ASCII code into three portions denoted as A1, B1, and C1 according to a first ratio;

calculate a first R value, a first G value, and a first B value according to the three portions of A1, B1, and C1, the first R value being 255/A1, the first G value being 255/B1, and the first B value being 255/C1; and combine the first R value, the first G value, and the first B value to the first RGB value.

11. The electronic device of claim 8 wherein the at least one processor is further caused to:

obtain an ordinal number of the alphabetic character in an alphabet; and calculate a ratio value according to the ordinal number and a preset scale factor; and set the ratio value as the transparency value.

12. The electronic device of claim 8 wherein the at least one processor is further caused to:

divide the numeric string into three portions denoted as A2, B2, and C2 according to a second ratio;

calculate a second R value, a second G value, and a second B value according to the three portions of A2, B2, and C2, the second R value being 255/A2, the second G value being 255/B2, and the second B value being 255/C2; and combine the second R value, the second G value, and the second B value to the second RGB value.

13. The electronic device of claim 8, wherein the at least one processor is further caused to:

generate a graphic according to the color values;

embed the graphic in the target webpage;

obtain a first RGB value, a transparency value, and a second RGB value according to the graphic;

obtain a Chinese character according to the first RGB value;

obtain an alphabetic character according to the transparency value;

obtain a numeric string according to the second RGB value; and obtain the user information according to the Chinese character, the alphabetic character, and the numeric string.

14. A non-transitory storage medium having stored thereon computer-readable instructions that, when executed by a processor of an electronic device, causes the processor to implement a method for embedding user information in webpages, the method comprising:

obtaining user information of a user who logs into a target web site;

converting the user information into color values, comprising: determining a Chinese character, an alphabetic character, and a numeric string in the user information; converting the Chinese character into a first RGB value according to a first conversion rule; converting the alphabetic character into a transparency value according to a second conversion rule; converting the numeric string into a second RGB value according to a third conversion rule; and obtaining the color values according to the first RGB value, the transparency value, and the second RGB value; and embedding the color values in a target webpage of the target website.

15. The non-transitory storage medium of claim 14, converting the Chinese character into a first RGB value according to a first conversion rule comprising:

converting the Chinese character into a decimal ASCII code;

dividing the decimal ASCII code into three portions denoted as A1, B1, and C1 according to a first ratio;

calculating a first R value, a first G value, and a first B value according to the three portions of A1, B1, and C1, the first R value being 255/A1, the first G value being 255/B1, and the first B value being 255/C1; and combining the first R value, the first G value, and the first B value to the first RGB value.

16. The non-transitory storage medium of claim 14, converting the alphabetic character into a transparency value according to a second conversion rule comprising:
    obtaining an ordinal number of the alphabetic character in an alphabet; and
    calculating a ratio value according to the ordinal number and a preset scale factor; and
    setting the ratio value as the transparency value.

17. The non-transitory storage medium of claim 14, converting the numeric string into a second RGB value according to a third conversion rule comprising:
    dividing the numeric string into three portions denoted as A2, B2, and C2 according to a second ratio;
    calculating a second R value, a second G value, and a second B value according to the three portions of A2, B2, and C2, the second R value being 255/A2, the second G value being 255/B2, and the second B value being 255/C2; and
    combining the second R value, the second G value, and the second B value to the second RGB value.

\* \* \* \* \*